United States Patent

[11] 3,632,986

[72] Inventor Harold M. Neer
 Bartlesville, Okla.
[21] Appl. No. 37,968
[22] Filed May 18, 1970
[45] Patented Jan. 4, 1972
[73] Assignee Phillips Petroleum Company

[54] TEMPERATURE CONTROL SYSTEM
 5 Claims, 1 Drawing Fig.
[52] U.S. Cl. .................................................... 219/501,
 219/499
[51] Int. Cl. ..................................................... H05b 1/02
[50] Field of Search ........................................ 219/501,
 499

[56] References Cited
UNITED STATES PATENTS

| | | | |
|---|---|---|---|
| 3,275,802 | 9/1966 | Vandivere et al. ............ | 219/499 |
| 3,381,226 | 4/1968 | Jones et al. .................. | 219/501 |
| 3,467,817 | 9/1969 | Fricker ........................ | 219/501 |

Primary Examiner—Bernard A. Gilheany
Assistant Examiner—F. E. Bell
Attorney—Young and Quigg ABSTRACT: A temperature-sensing thermistor and a heating element are positioned in a region of temperature to be controlled. The thermistor is connected in a bridge circuit, the output of which charges a capacitor. The voltage on the capacitor controls the firing of a thyristor which passes current to the heating element. Means are provided for discharging the capacitor periodically.

PATENTED JAN 4 1972
3,632,986
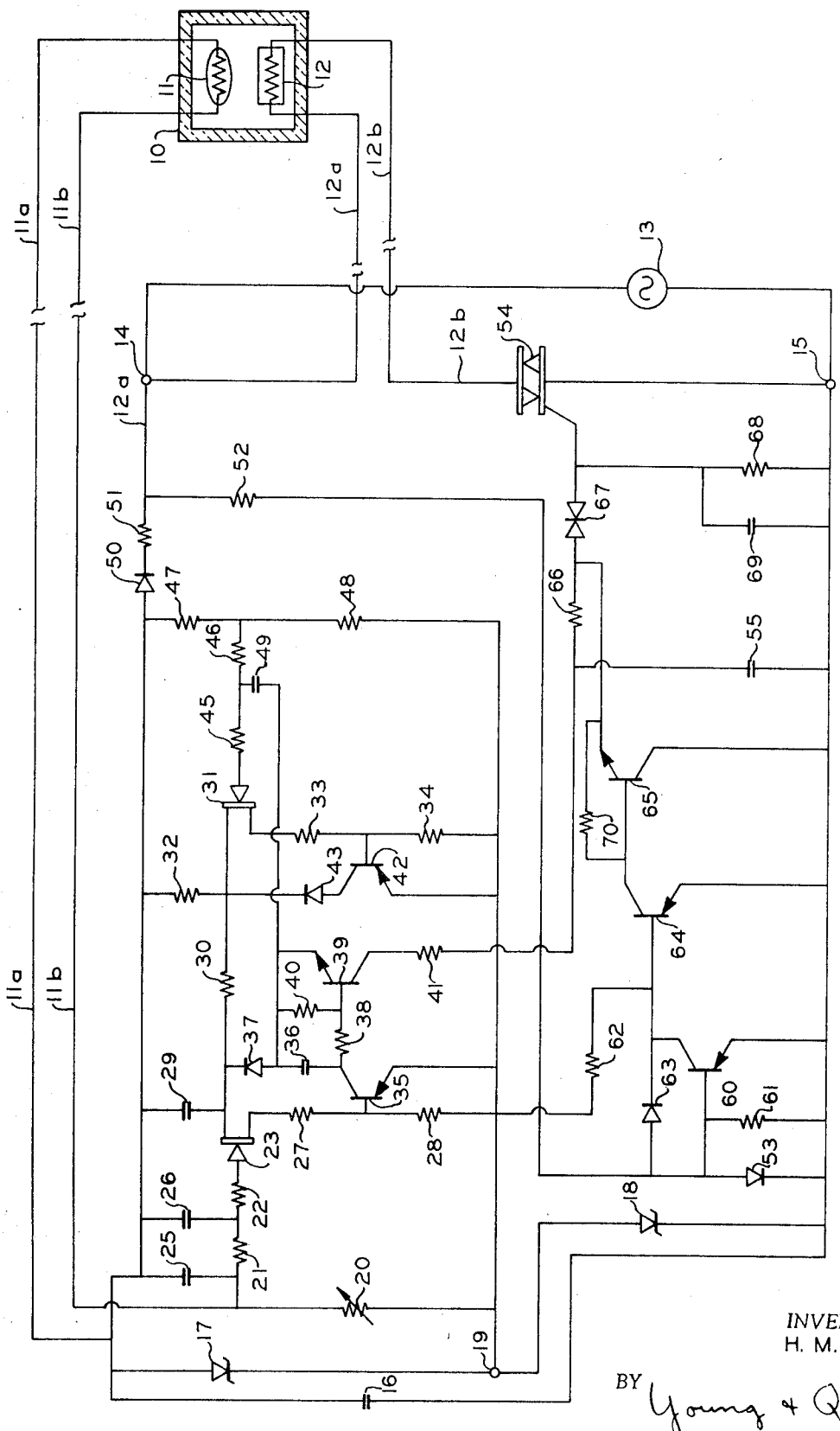
INVENTOR.
H. M. NEER
BY Young & Quigg
ATTORNEYS

TEMPERATURE CONTROL SYSTEM

It is common practice to control various types of processes in response to output signals of analytical instruments. Many of these analytical instruments must be maintained at constant temperatures in order to provide reliable measurements. This is usually accomplished by positioning the instrument in an insulated housing and regulating the temperature within the housing in response to a measurement of the temperature therein. Various types of temperature control systems are well known in the art for accomplishing this result.

In many industrial operations it is necessary to position the analytical instrument at a location which is remote from the control equipment utilized to regulate the temperature of the instrument housing. This is particularly true where there is a danger of explosions from electrical sparks and where space is at a premium. In operations of this type it is necessary to connect the temperature-sensing element to the control circuit by electrical leads which may be of substantial length. This can result in the generation of extraneous signals, particularly when the leads are located in the vicinity of other electrical equipment.

In accordance with this invention, there is provided an improved temperature control system which is particularly adapted to be used when the sensing element is positioned a substantial distance from the remainder of the circuit. The control system of this invention utilizes a bidirectional triode thyristor (triac) to control the application of heating current in response to a measured temperature. The passage of current through the triac is regulated in response to the charge accumulated on a capacitor. The temperature-sensing element is connected in a bridge circuit, the output of which is amplified to control the rate at which the capacitor is charged. The capacitor is quickly discharged during each cycle of voltage applied across the triac so that the charging of the capacitor starts from a constant level during each cycle.

The accompanying drawing is a schematic circuit diagram of apparatus constructed in accordance with this invention.

Referring now to the drawing in detail, there is shown a housing 10 which contains a temperature-sensitive resistance element 11 and an electrical heating element 12. Housing 10 can also contain an analytical instrument or other equipment, not shown, which is to be maintained at a constant temperature. Electrical leads 11a and 11b serve to connect resistor 11 to the control circuit of this invention, and leads 12a and 12b connect heater 12 to the control circuit. Housing 10 can be positioned a substantial distance from the remainder of the control circuit, although this is not necessary.

The control circuit is energized by a source of alternating current 13 which is connected across terminals 14 and 15, the latter being the neutral lead, returned to ground elsewhere, in the power system. Heater 12 and a triac 54 are connected in series relationship between terminals 14 and 15 so that triac 54 controls the current flow through heater 12 to regulate the temperature of the interior of housing 10. The circuit employed to control conduction through triac 54 is in turn controlled by the resistance of element 11. Lead 11a is connected to one terminal of a capacitor 16, the second terminal of which is connected to ground. Voltage regulating Zener diodes 17 and 18 are connected in series relationship between lead 11a and ground, the junction between these diodes being designated as terminal 19. A variable resistor 20 is connected between terminal 19 and lead 11b. A diode 50 and a resistor 51 are connected between lead 11a and power terminal 14. Temperature-sensitive resistor 11 and variable resistor 20 thus constitute two arms of a bridge network.

The junction between resistors 11 and 20 is connected by resistors 21 and 22 to the gate terminal of a field effect transistor 23. A first capacitor 25 is connected between lead 11a and the junction between resistors 11 and 20. A second capacitor 26 is connected between lead 11a and the junction between resistors 21 and 22. The drain terminal of transistor 23 is connected by resistors 27 and 28 to terminal 19. A capacitor 29 is connected between the source terminal of transistor 23 and lead 11a. A resistor 30 is connected between the source terminal of transistor 23 and the source terminal of a second field effect transistor 31. A resistor 32 is connected between the source terminal of transistor 31 and lead 11a. Resistors 33 and 34 are connected between the drain terminal of transistor 31 and the terminal 19. The emitter of a transistor 35 is connected to terminal 19, and the base of this transistor is connected to the junction between resistors 27 and 28. A capacitor 36 and a diode 37 are connected between the collector of transistor 35 and the source terminal of transistor 23. The collector of transistor 35 is connected by a resistor 38 to the base of a transistor 39. A resistor 40 is connected between the base of transistor 39 and the junction between capacitor 36 and diode 37. The collector of transistor 39 is connected by a resistor 41 to the first terminal of a capacitor 55. The second terminal of capacitor 55 is connected to terminal 15. The emitter of a transistor 42 is connected to terminal 19, and the base of this transistor is connected to the junction between resistors 33 and 34. A diode 43 is connected between the collector of transistor 42 and the source of transistor 31. The gate of transistor 31 is connected by a resistor 45 and resistors 46 and 47 to rectifier 50. A resistor 48 is connected between terminal 19 and the junction between resistors 46 and 47. A capacitor 49 is connected between the emitter of transistor 39 and the junction between resistors 45 and 46.

Resistors 47 and 48 constitute the respective third and fourth arms of the bridge network previously mentioned. The transistor circuit thus far described constitutes a differential amplifier which compares the potential at the junction between resistors 11 and 20 with the potential at the junction between resistors 47 and 48. Any difference between these two potentials is amplified by the differential amplifier. The output signal of the differential amplifier, which appears at the collector of transistor 39, serves to charge capacitor 55. As described in greater detail hereinafter, the potential on capacitor 55 serves to control current flow through triac 54 and thus the amount of heat supplied by element 12.

Capacitors 25 and 26 and resistor 21, which has a very large value, serve to filter any alternating current signals which may appear across leads 11a and 11b. This is particularly important when housing 10 is remote from the remainder of the circuit and the leads pass in close proximity to other electrical equipment.

A circuit is provided to discharge capacitor 55 at the end of each half cycle of applied voltage from source 13. This assures that the charging of capacitor 55 always starts at the same level. To this end, a resistor 52 and a diode 53 are connected in series between terminals 14 and 15. The junction between elements 52 and 53 is connected to the base of a transistor 60. A resistor 61 is connected between the base of this transistor and terminal 15. A resistor 62 is connected between the collector of transistor 60 and terminal 19. A diode 63 is connected between resistor 52 and the collector of transistor 60. The collector of transistor 60 is also connected to the base of a transistor 64 which has a grounded emitter. The collector of transistor 64 is connected to the base of a transistor 65 which has a grounded collector. The emitter of transistor 65 is connected to the junction between a resistor 66 and a trigger diode 68, which can be bilateral trigger diode, type MPT 20. The second terminal of resistor 66 is connected to capacitor 55. The second terminal of trigger diode 67 is connected to the control electrode of triac 54. A resistor 68 and a capacitor 69 are connected in parallel between trigger diode 67 and terminal 15.

As previously mentioned, capacitor 55 is charged in response to an unbalance signal of the bridge network which includes resistance element 11. When the potential on capacitor 55 equals the breakdown potential of trigger 67, conduction takes place to fire triac 54. Capacitor 55 is discharged during each half cycle of applied potential by the circuit which includes transistors 65, 64 and 60. When a positive potential appears at the junction between resistor 52 and diode 53, diode 63 conducts. This serves to cut off transistor 64 and transistor 65. When a negative potential appears at the junction between resistor 52 and rectifier 53, transistor 60 conducts. This also serves to cut off transistor 64 and transistor 65. However, during each half cycle of applied potential, when the potential at the junction between resistor 52 and rectifier 53 is substantially zero, transistors 64 and 65 conduct. This discharges capacitor 55 through resistor 66. Thus, the charging of capacitor 55 begins from a zero value during each half cycle of applied potential from source 13. The speed at which capacitor 55 is charged up to the threshold value of trigger 67 determines the duration that triac 54 is fired during each half cycle of applied potential. This in turn regulates the duration of current flow through heating element 12 and thus the temperature of housing 10.

While this invention has been described in conjunction with a presently preferred embodiment, it obviously is not limited thereto.

What is claimed is:
1. Temperature control apparatus comprising:
an electrical heating element;
a temperature-sensing element adapted to be positioned in a region of temperature to be controlled;
a source of alternating current;
a bidirectional thyristor having a gate electrode;
means connecting said thyristor and said heating element in circuit with said source of alternating current;
a capacitor;
circuit means including said temperature sensing element to establish a current, the magnitude of which is representative of the temperature sensed by said sensing element;
means to apply the current established by said circuit means to said capacitor to charge same;
trigger circuit means connected between said capacitor and the gate electrode of said thyristor to cause said thyristor to conduct when said capacitor is charged to a predetermined potential; and
means connected to said capacitor and said source of alternating current to provide a circuit path independent of said circuit means to discharge said capacitor at the end of each half cycle of potential applied across said thyristor from said source of alternating current.

2. The apparatus of claim 1 wherein said trigger circuit means comprises a trigger diode connected between said capacitor and said thyristor.

3. The apparatus of claim 1 wherein said means to discharge comprises a transistor connected between said capacitor and ground, and means connected to said source of alternating current to cause said transistor to be nonconductive except at the end of each half cycle of said alternating current when the potential applied across said thyristor is zero, at which time said transistor is conductive.

4. The apparatus of claim 3 wherein said means to cause said transistor to be nonconductive comprises a resistor and a first diode connected in series across said source of alternating current, means including a second diode connected between the junction between said resistor and first diode and said transistor to cause said transistor to be nonconductive when a potential of first polarity exists at said junction, and means including a second transistor connected between said junction and the first-mentioned transistor to cause said first-mentioned transistor to be nonconductive when a potential of second polarity exists at said junction.

5. The apparatus of claim 4 wherein each of said transistors has an emitter, a collector and a base, the base of said second transistor is connected to said junction, said second diode is connected between the base and collector of said second transistor, the emitters of said transistors are connected to ground, the collector of said second transistor is connected to the base of said first-mentioned transistor, and including means connecting the collector of said first-mentioned transistor to said capacitor.

* * * * *